(12) United States Patent
Lemmon et al.

(10) Patent No.: US 6,917,728 B2
(45) Date of Patent: Jul. 12, 2005

(54) FIBER OPTIC ATTACHMENT METHOD, STRUCTURE, AND SYSTEM

(75) Inventors: Michael S. Lemmon, Vestal, NY (US); Mark V. Pierson, Binghamton, NY (US)

(73) Assignee: International Business Machines Corporation, Armonk, NY (US)

( * ) Notice: Subject to any disclaimer, the term of this patent is extended or adjusted under 35 U.S.C. 154(b) by 34 days.

(21) Appl. No.: 10/608,057

(22) Filed: Jun. 27, 2003

(65) Prior Publication Data

US 2004/0264861 A1 Dec. 30, 2004

(51) Int. Cl.$^7$ ................................................. G02B 6/12
(52) U.S. Cl. ............................ 385/14; 385/49; 385/88; 385/95; 385/96
(58) Field of Search ............................ 385/95, 96, 97, 385/98, 99, 115, 49, 88, 89, 92, 14, 129, 130, 131

(56) References Cited

U.S. PATENT DOCUMENTS

| | | | |
|---|---|---|---|
| 4,383,318 A | 5/1983 | Barry et al. .................... | 372/6 |
| 4,515,432 A | 5/1985 | Sherwin ......................... | 372/6 |
| 4,682,335 A | 7/1987 | Hughes .......................... | 372/6 |
| 4,815,079 A | 3/1989 | Snitzer et al. ................. | 372/6 |
| 5,208,885 A * | 5/1993 | Dragone et al. .............. | 385/49 |
| 5,528,713 A | 6/1996 | Dannoux et al. ............. | 385/80 |
| 6,169,833 B1 | 1/2001 | Goossen et al. .............. | 385/49 |
| 2002/0009270 A1 | 1/2002 | Laor ............................ | 385/95 |
| 2002/0110331 A1 | 8/2002 | Farrelly et al. ............... | 385/51 |

* cited by examiner

*Primary Examiner*—Brian M. Healy
(74) *Attorney, Agent, or Firm*—Schmeiser, Olsen & Watts; William E. Schiesser (57) ABSTRACT

An attachment structure, and an associated method and system for forming the attachment structure. An end of an optical fiber is melted while the end is above, but not touching, an exposed surface of a substrate such that said end becomes molten. The optical fiber is substantially optically transparent to laser radiation of a given wavelength. The molten end is moved toward the exposed surface of the substrate until the end makes physical contact with the exposed surface of the substrate. The moving is performed sufficiently fast so that the end is still molten when the end initially makes the physical contact with the exposed surface of the substrate. The physical contact is maintained for a sufficient length of time to enable the end to bond to the exposed surface of the substrate with no intervening matter between the end and the exposed surface of the substrate.

39 Claims, 6 Drawing Sheets

FIG. 8

FIBER OPTIC ATTACHMENT METHOD, STRUCTURE, AND SYSTEM

BACKGROUND OF THE INVENTION

1. Technical Field

The present invention relates to an attachment structure and to a method and system for forming the attachment structure.

2. Related Art

Current methods and systems for effectuating attachment of optical fibers are inefficient and result in complex and costly fiber optic attachment structures. Accordingly, an efficient method and system is needed for effectuating attachment of optical fibers to form simple and economical fiber optic attachment structures.

SUMMARY OF THE INVENTION

The present invention provides a method, comprising the following steps of in the indicated sequential order:

melting an end of an optical fiber while the end is above, but not touching, an exposed surface of a substrate such that said end becomes molten end, said optical fiber being substantially optically transparent to laser radiation of a given wavelength;

moving the molten end toward the exposed surface of the substrate until the end makes physical contact with the exposed surface of the substrate, said moving being performed sufficiently fast so that the end is still molten when the end initially makes said physical contact with the exposed surface of the substrate; and maintaining said physical contact for a sufficient length of time to enable the end to bond to the exposed surface of the substrate with no intervening matter between the end and the exposed surface of the substrate.

The present invention provides a structure, comprising:

a first substrate having a front surface;

a second substrate having a front surface; and at least one optical fiber having a first end and a second end, said optical fiber being substantially optically transparent to laser radiation of a given wavelength, said optical fiber being continuous and integral from the first end to the second end, said first end being directly bonded to the front surface of the first substrate with no intervening matter between the first end and the front surface of the first substrate, said second end being directly bonded to the front surface of the second substrate with no intervening matter between the second end and the front surface of the second substrate.

The present invention provides a system, comprising:

means for melting an end of an optical fiber while the end is above, but not touching, an exposed surface of a substrate such that the end becomes molten, said substrate being substantially optically transparent to laser radiation of a given wavelength, said optical fiber being substantially transparent to laser radiation of a given wavelength;

means for moving the molten end toward the exposed surface of the substrate until the end makes physical contact with the exposed surface of the substrate, said moving being performed sufficiently fast so that the end is still molten when the end initially makes said physical contact with the exposed surface of the substrate; and means for maintaining said physical contact for a sufficient length of time to enable the end to bond to the exposed surface of the substrate.

The present invention provides an efficient method and system for effectuating attachment of optical fibers to form simple and economical fiber optic attachment structures.

DETAILED DESCRIPTION OF THE INVENTION

Figure 1:
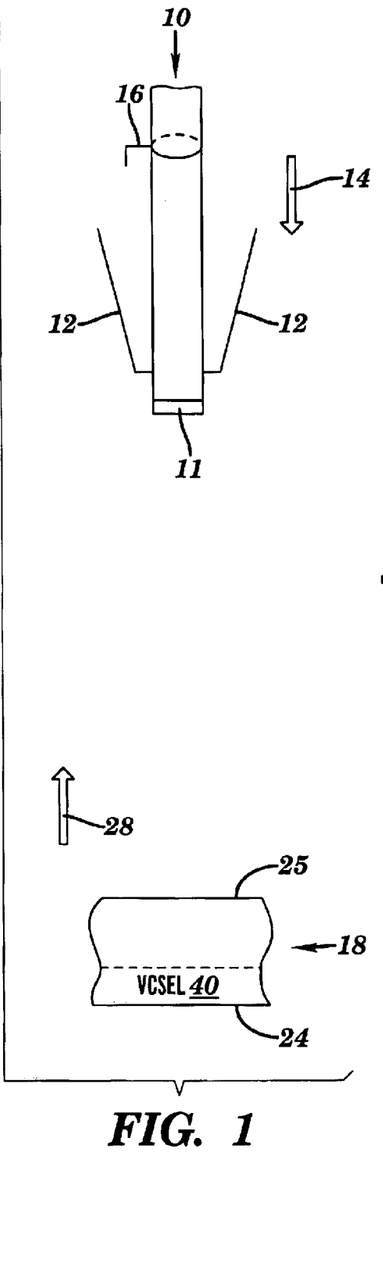
FIG. 1 depicts a front cross-sectional view of an optical fiber moving through a feed nozzle, in accordance with embodiments of the present invention.

FIG. 1 depicts a front cross-sectional view of an optical fiber 10 having an end 11, wherein the optical fiber 10 is moving through an anchored (i.e., fixed in space) feed nozzle 12 in a direction 14 toward a substrate 18, in accordance with embodiments of the present invention. The optical fiber 10 is substantially optically transparent to laser radiation of a given wavelength. The feed nozzle 12 may be embodied in, inter alia, jaws. The optical fiber 10 may comprise glass optical fiber, plastic optical fiber, etc. The optical fiber 10 has any diameter known to be in use (e.g., inter alia, 2 to 4 mils diameter) by a person of ordinary skill in the art. The optical fiber 10 is being moved in the direction 14 toward the substrate 18 by moving means 16, which is any means known to a person of ordinary skill in the art for imparting motion to the optical fiber 10. For example, the moving means 16 may be a mechanism that grasps the optical fiber 10 and moves the optical fiber 10 through the feed nozzle 12 in a direction 14 toward the substrate 18. As such, the moving means 16 may be, inter alia, a human hand, a wirebond-type machine, robotic means remotely controlled by hardware or software, etc. The feed nozzle 12 serves to constrain the optical fiber 10 to move in the direction 14 toward the substrate 18. While the direction 14 may be a fixed direction and is depicted in FIG. 1 as being about normally directed toward the front surface 25 of the substrate 18, the direction 14 may generally be oriented at any angle with respect to the front surface 25 of the substrate 18 (e.g., inter alia, 60 to 90 degrees with respect to the plane of the front surface 25).

The method and system of the present invention will subsequently bond the end 11 to the exposed surface (i.e., front surface 25) of the substrate 18. Thus, the end 11 is a terminal portion of the optical fiber 10 that will subsequently become molten and be made to bond to the front surface 25 of the substrate 18. Hence, the substrate 18 must comprise a material capable of bonding directly to the optical fiber 10 with no intervening matter between the substrate 18 and the optical fiber 10.

The substrate 18 may comprise a laser source 40 that generates and emits the laser radiation that is substantially optically transparent to the laser radiation of the given wavelength. For example, the laser source 40 maybe comprise, inter alia, a Vertical Cavity Surface Emitting Laser (VCSEL) which emits the laser wavelength in a range of 780 to 1550 nanometers (e.g., 980 nanometers) from a region within the substrate 18. Said region within the substrate 18 may comprise the back surface 24 of the substrate 18. A VCSEL is a specialized laser diode emitting laser radiation perpendicular to the back surface 24 and offers low power consumption and overall improved efficiency as compared with conventional edge-emitting laser diodes. The substrate 18 is substantially optically transparent to said laser radiation in an optical path in the substrate 18 between the VCSEL 40 and the front surface 25 of the substrate 18 (sec. e.g., optical path 26 in FIG. 4, discussed infra).

Referring again to FIG. 1, the present invention may include any type of laser emitting device that is capable of emitting the laser radiation such that the laser radiation may be transmitted from the laser emitting device to the front surface 25, or alternatively the laser radiation may be emitted by the laser emitting device at the front surface 25. As seen in FIG. 1, the front surface 25 of the substrate 18 comprises an exposed surface of the substrate 18. Although the front surface 25 may alternatively receive the laser radiation from above the substrate 18 and may subsequently transmit the laser radiation into the substrate 18 and potentially to the back surface 24, the substrate 18 will be considered for illustrative purposes as a transmitter of the laser radiation rather than as a receiver of the laser radiation. The substrate 18 may include, inter alia, SiGe, GaAs, AlGaAs, or InGaAs.

Figure 2:
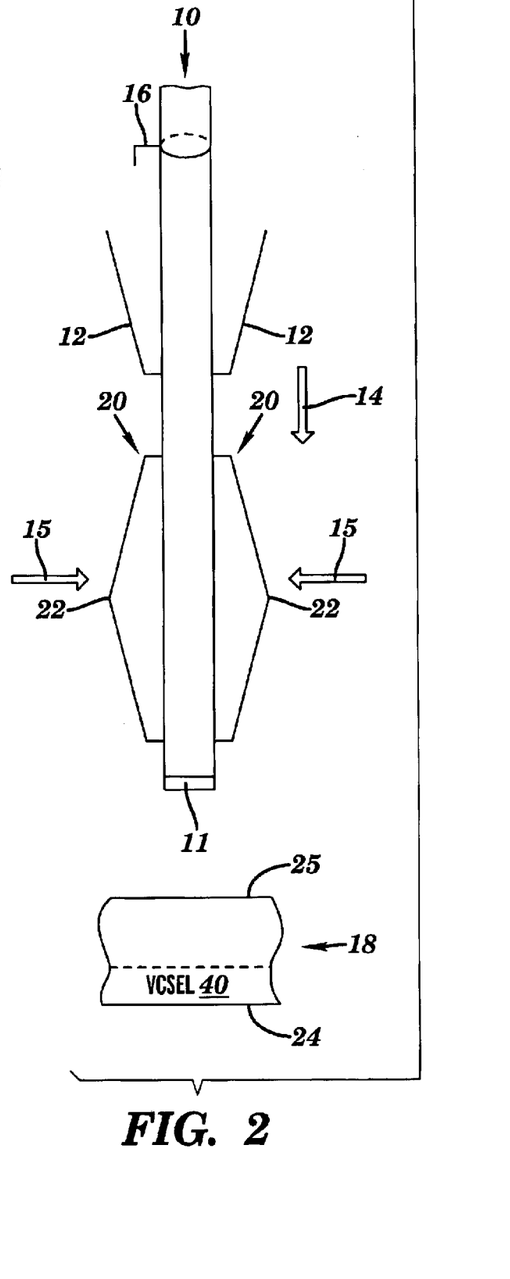
FIG. 2 depicts the optical fiber of FIG. 1 with a portion of the optical fiber being engaged by a capillary having side clamps, in accordance with embodiments of the present invention.

FIG. 2 depicts the optical fiber 10 of FIG. 1 with a portion of the optical fiber 10 being engaged below the feed nozzle 12 by a capillary 20 having side clamps 22, in accordance with embodiments of the present invention. In FIG. 2 with the side clamps 22 in the "relaxed" position shown, the optical fiber 10 continues to be moved (by the moving means 16) through the feed nozzle 12 in the direction 14 toward the substrate 18 in such a manner that the capillary 20 moves together with the optical fiber 10 in the direction 14. The side clamps 22 of the capillary 20, if moved inward in the direction 15 toward the optical fiber 10, will cause the optical fiber 10 to move the direction 14 relative to the capillary 20 as will been apparent from the description infra of FIG. 4.

Figure 3:
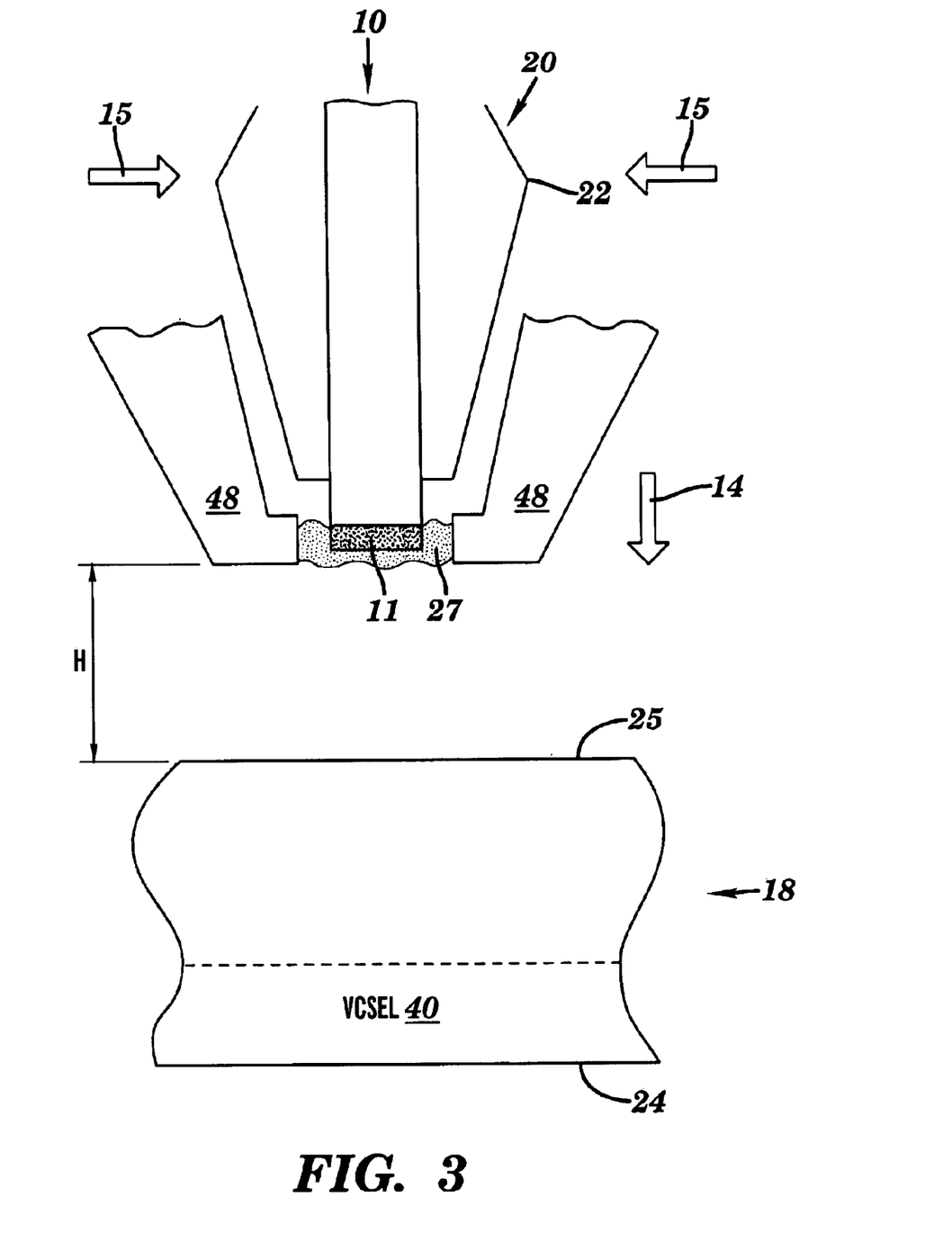
FIG. 3 depicts the optical fiber of FIG. 2 above an exposed surface of a first substrate such that an end of the optical fiber is being melted by an electric arc between a pair of electrodes, accordance with embodiments of the present invention.

FIG. 3 depicts the optical fiber 10 of FIG. 2 above the exposed surface 25 of the substrate 18 such that the end 11 of the optical fiber 10 is being melted by any applicable method of applying heat that is known to a person of ordinary skill in the art such as, inter alia, by an electric arc 27 between a pair of electrodes 48 with an output power sufficient to melt the end 11. As a result of the melting, the end 11 becomes molten. The side clamps 22 are being squeezed in the direction 15 toward the optical fiber 10 so as to impart a compressive force to the molten end 11 causing the molten end 11 to move toward the exposed surface 25 of the substrate 18 and make physical contact with the exposed surface 25 of the substrate 18 while the end 11 is still molten. The melting occurs when the end 11 is above the exposed surface 25 and is not touching the exposed surface 25. After the end 11 has become molten, the electrodes 48 may be moved out of the way so that the molten end 11 can be quickly moved in the direction 14 toward the substrate 18. Alternatively after the end 11 has become molten, the electrodes 48 may be moved together with the fiber 10 in the direction 14 toward the substrate 18 (but not touching the substrate 18) such that the tapered shape (which appears conical in FIG. 3) of the electrodes 48 enables the electrodes 48 to move other optical fibers attached to the substrate 18 out of the way so as to clear a path for movement of the molten end 11 toward the substrate 18.

In FIG. 3, the height H of the end 11 above the front surface 25 at which the end 11 is being melted must be small enough so that the end 11 could be subsequently moved from the height H in the direction 14 to make physical contact with the substrate 18 and still remain molten upon initially making said physical contact. Thus the minimum value of the height H varies as the inverse of the average transport velocity of the end 11 toward the front surface 25. However, the minimum value of the height H is further constrained by space considerations. For example, there may be a multitude of such optical fibers (similar to the optical fiber 10) or other structure bonded to the front surface 25, and the number and spatial distribution of such optical fibers may interfere with the melting of the end 11. Thus the existence of said multitude of optical fibers may increase the minimum possible value of the height H. Said multitude of optical fibers may be closely spaced such as having the optical fibers spaced, inter alia, 5 to 10 mils apart.

As an alternative embodiment, the substrate 18 may be preheated or otherwise heated in order to assist the reliability of the process of bonding the molten end 11 to the substrate 18. For example, a large temperature differential between the molten end 11 and the substrate 18 may result in thermal stresses in the substrate 18 and potential fracture and/or cracking of the substrate 18.

While FIGS. 1–3 show the substrate 18 as having been placed in a fixed position followed by moving the optical fiber 10 toward the substrate 18 in the direction 14, the substrate 18 may be alternatively moved into its position below the optical fiber 10 after the optical fiber 10 has been position at the height H.

Figures 4, 5:
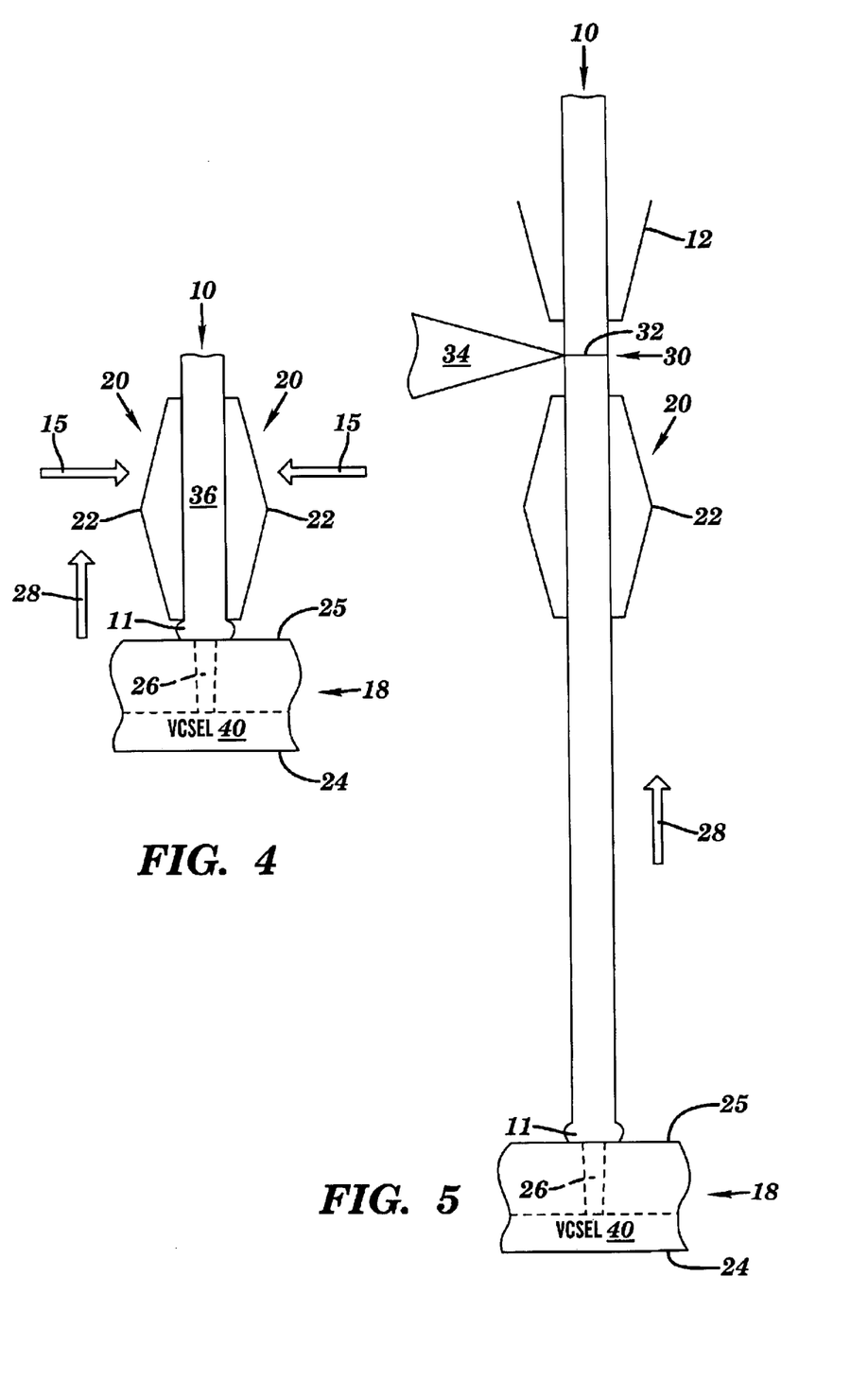
FIG. 4 depicts the molten end of the optical fiber of FIG. 3 being held in physical contact with the exposed surface of the first substrate after having been moved to the exposed surface of the first substrate, in accordance with embodiments of the present invention.
FIG. 5 depicts the optical fiber of FIG. 4 being scored at a location along the optical fiber with a sharp wedge to form a crack/flaw in the optical fiber, in accordance with embodiments of the present invention.

FIG. 4 depicts the molten end 11 of the optical fiber 10 of FIG. 3 being held in physical contact with the front surface 25 of the substrate 18, in accordance with embodiments of the present invention. Said physical contact is maintained by further squeezing of the side clamps 22 in the direction 15 toward the optical fiber 10 to maintain a compressive force on the molten end 11 so as to hold the optical fiber 10 in place. Said physical contact is maintained for a sufficient length of time to enable the end 11 to bond to the front surface 25 of the substrate 18 with no intervening matter between the end 11 and the front surface 25. The portion 36 of the optical fiber 10 is a terminal portion of optical fiber 10, said terminal portion 36 including the end 11. Note that the end 11 flares outward in directions approximately parallel to the direction 15.

After said bond between the end 11 and the front surface 25 has been formed and the optical fiber 10 has a connection at its other end 41 (see FIGS. 7 and 8, described infra), FIG. 4 depicts the VCSEL 40 in the substrate 18 as being adapted to emit the laser radiation. Accordingly, the substrate 18 will transmit said laser radiation from the VCSEL 40 in the direction 28 to the front surface 25 of the substrate 18 via laser path 26 within the substrate 18. The laser path 26 is substantially optically transparent to the laser radiation of the given wavelength. The laser radiation may subsequently enter the end 11 of the optical fiber 10 and then propagates through the optical fiber 10 away from the front surface 25. Alternatively as stated supra, the VCSEL 40 may be replaced by a laser source such as a laser source emits the laser radiation from the front surface 25 into the end 11 of the optical fiber 10.

FIG. 5 depicts the optical fiber 10 of FIG. 4 being scored at a location 30 along the optical fiber 10 with a sharp wedge 34 to form a crack/flaw 32 in the optical fiber 10, in accordance with embodiments of the present invention. The crack/flaw 32 may be, inter alia, in a plane that is normal to the axis of the optical fiber 10 (i.e., normal to the direction 28). The crack/flaw 32 may be generated by any other mechanical means such as by a combination of twisting and impact. Note that the capillary 22 has been retracted in the direction 28 relative to the optical fiber 10.

Figure 6:
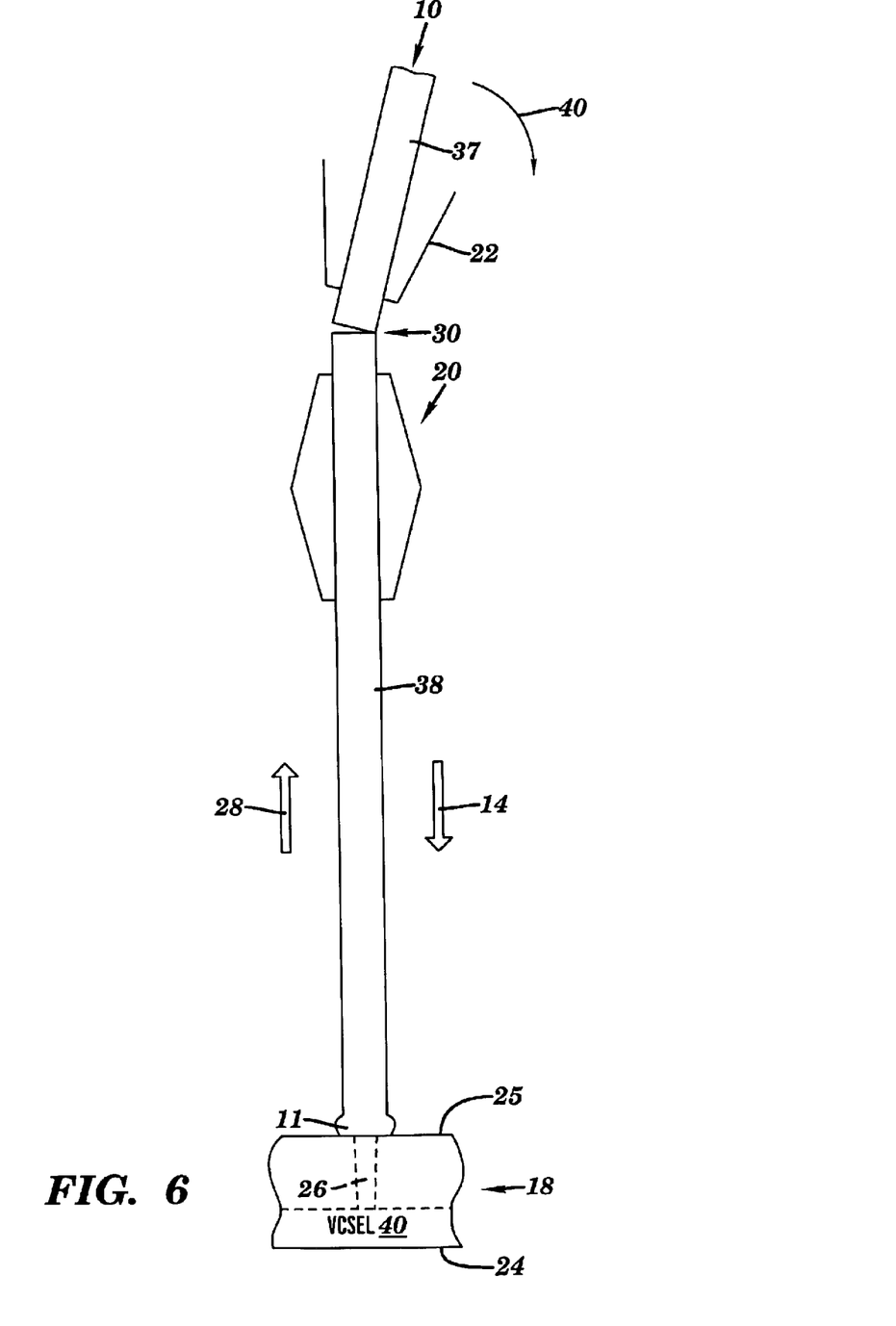
FIG. 6 depicts the optical fiber of FIG. 5 such that a portion of the optical fiber is being severed at and above the location at which the optical fiber has been scored, in accordance with embodiments of the present invention.

FIG. 6 depicts the optical fiber 10 of FIG. 5 such that a portion 37 of the optical fiber 10 is being severed at and above the location 30 at which the optical fiber 10 has been scored so as to leave a remaining portion 38 of the optical fiber 10, in accordance with embodiments of the present invention. The remaining portion 38 includes the end 11. The severing operation is facilitated by the presence of the crack/flaw 32 (see FIG. 5) at the location 30. The severing operation may be accomplished by any method known to one of ordinary skill in the art such as breaking away, twisting away, snapping away, sharp impact at an angle that causes severing, etc. The severing may occur in the clockwise direction 40, or alternatively in a counterclockwise direction.

Figure 7:
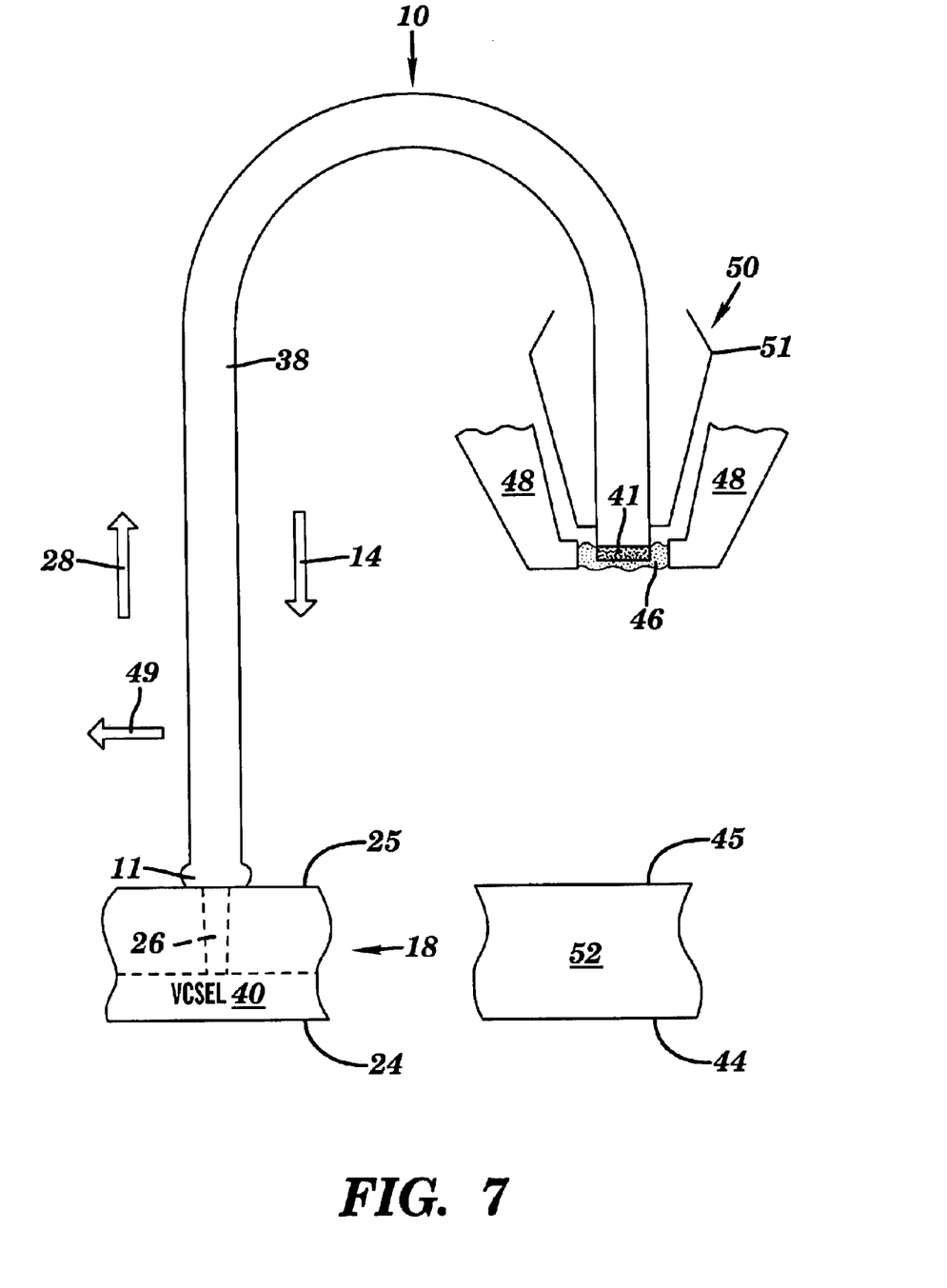
FIG. 7 depicts the optical fiber of FIG. 6 after having been rotated so as to orient a second end of the optical fiber toward an exposed surface of a second substrate, in accordance with embodiments of the present invention.

FIG. 7 depicts the optical fiber 10 of FIG. 6 after having been rotated so as to orient another end 41 of the optical fiber 10 toward an exposed surface 45 of a substrate 52, in accordance with embodiments of the present invention. The substrate 52 includes a front surface (i.e., the exposed surface 45) and a back surface 44. The substrate 52 is substantially optically transparent to said laser radiation at locations within the substrate 52 through which the laser radiation propagates. The substrate 52 is bondable with the end 41 of the optical fiber 10 in the same manner as the substrate 18 is bondable with the end 11 of the optical fiber 10 (e.g., with no intervening matter between the end 41 and the exposed surface 45). The substrate 52 may include, inter alia, SiGe, GaAs, AlGaAs, or InGaAs.

Rotating the optical fiber 10 may be accomplished, inter alia, by concurrently rotating the capillary 20 (see FIG. 6) clockwise or counterclockwise about the axis defined by the direction 28, in concert with moving the substrate 18 in the direction 49, and in further concert with moving the capillary 20 (see FIG. 6) in the direction 14, so that the minimum bend radius of the optical fiber 10 is not disturbed. Any equipment known to a person of ordinary skill in the art may be used to perform the aforementioned concurrent motions.

The optical fiber 10 is typically very thin and is thus easy to bend. Rotating the optical fiber 10 is a special case of orienting the optical fiber 10 in any manner so that the end 41 of the optical fiber 10 is facing the exposed surface 45 of the substrate 52.

While FIGS. 5–7 depict the scoring and severing of terminal portion 37 of the optical fiber 10 prior to said rotating of the optical fiber 10, the terminal portion 37 of the optical fiber 10 may alternatively be scored and severed after the optical fiber 10 has been rotated. On the other hand, if the optical fiber 10 has the desired length to begin with, then the scoring and severing steps of FIGS. 5 and 6, respectively, are unnecessary and may be omitted.

FIG. 7 also shows the end 41 being melted by electrodes 48 with an associated arc 46 in the same manner as the end 11 is melted by electrodes 24 with the arc 27 (see FIG. 3) as described supra. The capillary 50 with side clamps 51 in FIG. 7 has the same functionality as the capillary 20 with side clamps 22 in FIG. 3. The purpose of melting the end 41 is to subsequently bond the molten end 41 to the front surface 45 of the substrate 52 in the same manner as the end 11 was bonded to the front surface 25 of the substrate 18 as described supra.

Figure 8:
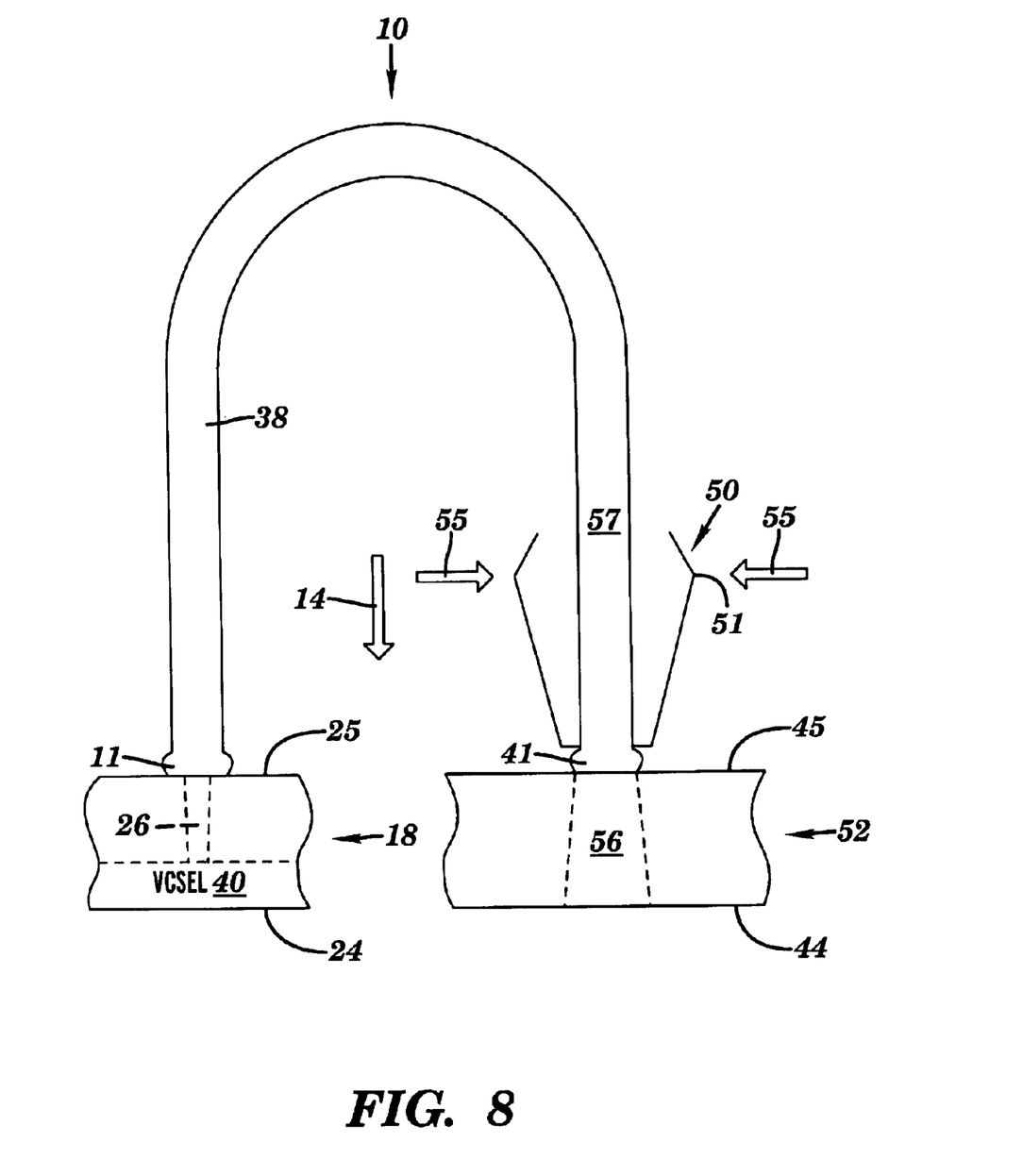
FIG. 8 depicts the second end of the optical fiber of FIG. 7 as being molten and being held in physical contact with the exposed surface of the second substrate after having been melted and moved to the exposed surface of the second substrate, in accordance with embodiments of the present invention.

FIG. 8 depicts the molten end 41 of the optical fiber 10 of FIG. 7 being held in physical contact with the front surface 45 of the substrate 52, in accordance with embodiments of the present invention. Said physical contact is maintained by squeezing the side clamps 51 in the direction 55 toward the optical fiber 10 to maintain a force on the molten end 41 in the direction 14. Said physical contact is maintained for a sufficient length of time to enable the end 41 to bond to the front surface 45 of the substrate 52 with no intervening matter between the end 41 and the front surface 45. The portion 57 of the optical fiber 10 is a terminal portion of optical fiber 10, said terminal portion 57 including the end 41.

The VCSEL 40 in the substrate 18 may emit the laser radiation as described supra in conjunction with FIG. 4, and said laser radiation enters the end 11 of the optical fiber 10 and then propagates through the optical fiber 10 to the end 41. The front surface 45 of the substrate 52 is adapted to receive said laser radiation from the end 41, and the substrate 52 is adapted to transmit said laser radiation from the end 41 into the substrate 52. The laser radiation may be then transmitted (via optical path 56 within the substrate 52) to any location within the substrate 52 along the optical path 56 including to the back surface 44 of the substrate 52. It is noted that the optical fiber 10 is continuous and integral from the end 11 to the end 41.

While FIG. 8 depicts one optical fiber, namely the optical fiber 10, being continuous and integral between the ends 11 and 41 which are respectively connected to the front surface 25 and 45 of substrate 18 and 52, there is generally N such optical fibers such that N is at least 1. N may equal 1 or 2, N may be at least 1000, or N may represent thousands or hundreds of thousands of optical fibers.

While the front surfaces 25 and 45 may be coplanar (e.g., in a computer) as depicted in FIG. 8, the front surfaces 25 and 45 may alternatively not be coplanar (e.g., the as with two circuit boards/circuit cards). If the front surfaces 25 and 45 are not coplanar, then the front surfaces 25 and 45 may be parallel to each other, perpendicular to each other, or at any nonzero angle with respect to each other such that said nonzero angle is unequal to 90 degrees.

While the substrate 18 in FIGS. 4–8 was depicted as being comprised by a first device (i.e., a transmitting device such as a VCSEL) and while the substrate 52 was depicted in FIG. 8 as being comprised by a second device (i.e., a receiving device), the substrates 18 and 52 may be comprised be a same device.

While the substrates 18 and 52 may comprise a same substantially optically transparent material, the substrates 18 and 52 may alternatively comprise different substantially optically transparent materials.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method, comprising the following steps of in the indicated sequential order:
   melting an end of an optical fiber while the end is above, but not touching, an exposed surface of a substrate such that said end becomes molten end, said optical fiber being substantially optically transparent to laser radiation of a given wavelength;
   moving the molten end toward the exposed surface of the substrate unit the end makes physical contact with the exposed surface of the substrate, said moving being performed sufficiently fast so that the end is still molten when the end initially makes said physical contact with the exposed surface of the substrate; and
   maintaining said physical contact for a sufficient length of time to enable the end to bond to the exposed surface of the substrate with no intervening matter between the end and the exposed surface of the substrate.

2. The method of claim 1, wherein said molting comprises exposing the end to an electric are disposed between a pair of electrodes.

3. The method of claim 1, wherein said moving comprises moving the optical fiber through an anchored feed nozzle that facilitates the molten end moving in a fixed direction toward the exposed surface.

4. The method of claim 1, wherein said moving comprises squeezing side clamps of a capillary that engages the optical fiber proximate the end, and wherein said squeezing imparts a force to the molten end causing the molten end to move toward the exposed surface of the substrate and make said physical contact with the exposed surface of the substrate.

5. The method of claim 4, wherein said maintaining said physical contact comprises further squeezing said side clamps while the end is making said physical contact with the exposed surface of the substrate, said further squeezing causing said physical contact to be maintained.

6. The method of claim 1, wherein the substrate comprises an optical receiver, and wherein the method further comprises after the maintaining step: receiving said laser radiation by said optical receiver at said bonded end after said laser radiation has propagated through the optical fiber to said bonded end.

7. The method of claim 1, wherein after the maintaining step: transmitting said laser radiation, by a laser source in a region within the substrate, to the exposed surface of the substrate and then into the bonded end of the optical fiber.

8. The method of claim 7, wherein the laser source is a Vertical Cavity Surface Emitting Laser (VCSEL), and wherein the substrate is substantially optically transparent to said laser radiation in an optical path in the substrate between the VCSEL and the bonded end of the optical fiber.

9. The method or claim 1, said substrate being a first substrate, said end being a first end of the optical fiber, said method further comprising:
   orienting a second end of the optical fiber toward an exposed surface of a second substrate that is substantially optically transparent to the laser radiation;
   melting the second end of the optical fiber while the second end is above, but not touching, the exposed surface of the second substrate such that the second end becomes molten, said optical fiber being continuous and integral from the first end to the second end;
   moving the molten second end toward the exposed surface of the second substrate until the second end makes physical contact with the exposed surface of the second substrate, said moving being executed sufficiently fast so that the second end is still molten when the second end initially makes said physical contact with the exposed surface of the second substrate; and
   maintaining said physical contact for a sufficient length of time to enable the second end to bond to the exposed surface of the second substrate with no intervening matter between the second end and the exposed surface of the second substrate.

10. The method of claim 9, wherein said orienting comprises rotating an end portion of the optical fiber, wherein the end portion includes the second end.

11. The method of claim 9, further comprising prior to said orienting: severing away a terminal portion of the optical fiber at a location along the optical fiber.

12. The method of claim 9, further comprising after said orienting: severing away a terminal portion of the optical fiber at a location along the optical fiber.

13. The method of claim 9, further comprising: transmitting said laser radiation, by a laser source located in a region within the first substrate, to the exposed surface of the first substrate and then into the first end of the optical fiber and then through the optical fiber to the second end of the optical fiber and into the second substrate.

14. The method of claim 13, wherein the laser source is a Vertical Cavity Surface Emitting Laser (VCSEL), wherein the first substrate is substantially optically transparent to said laser radiation in an optical path in the first substrate between the VCSEL end the bonded end of the optical fiber, and wherein the second substrate comprises an optical receiver.

15. The method of claim 1, wherein the wavelength is in a range of 780 to 1550 nanometers.

16. The method of claim 1, wherein the substrate comprises a material selected from the group consisting of SiGe, GaAs, AlGAs, and InGaAs.

17. A structure comprising:
   a first substrate having a front surface;
   a second substrate having a front surface; and
   at least one optical fiber having a first end and a second end, said optical fiber being substantially optically transparent to laser radiation of a given wavelength, said optical fiber being continuous and integral from the first and to the second end, said first end being directly bonded to the front surface of the first substrate with no intervening matter between the first end and the front surface of the first substrate, said second end being directly bonded to the front surface of the second substrate, with no intervening matter between the second end and the front surface of the second substrate, wherein a laser source in a region within the first substrate is adapted to emit said laser radiation and transmit the emitted laser radiation from the laser source to the first end of the optical fiber and through the optical fiber to the second end of the optical fiber and then into the second substrate, wherein said region in which the laser source is located comprises a back surface of the first substrate, and wherein the back surface of the first substrate is opposite the front surface of the first substrate.

18. The structure of claim 17, wherein the laser source is a Vertical Cavity Surface Emitting Laser (VCSEL), wherein the first substrate is substantially optically transparent to said laser radiation in an optical path in the first substrate between the VCSEL and the first end of the optical fiber, and wherein the second substrate comprises an optical receiver.

19. The structure of claim 17, wherein said at least one optical fiber consists of at least two optical fibers, wherein two of said at least two optical fibers are spaced apart by no more than about 10 mils.

20. The structure of claim 17, wherein the front surface of the first substrate and the front surface of the second substrate are coplanar.

21. A structure, comprising:
a first substrate having a front surface;
a second substrate having a front surface; and
at least one optical fiber having a first end and a second end, said optical fiber being substantially optically transparent to laser radiation of a given wavelength, said optical fiber being continuous and integral from the first end to the second end, said first end being directly bonded to the front surface of the first substrate with no intervening matter between the first end and the front surface of the first substrate, said second end being directly bonded to the front surface of the second substrate with no intervening matter between the second end and the front surface of the second substrate, wherein the front surface of the first substrate and the front surface of the second substrate are at a nonzero angle with respect to each other such that the nonzero angle is unequal to 90 degrees.

22. The structure of claim 17, wherein the first and second substrates are comprised by a device.

23. The structure of claim 17, wherein the first substrate is comprised by a first device and wherein the second substrate is comprised by a second device.

24. A structure, comprising:
a first substrate having a front surface;
a second substrate having a front surface; and
at least one optical fiber having a first end and a second end, said optical fiber being substantially optically transparent to laser radiation of a given wavelength, said optical fiber being continuous and integral from the first end to the second end, said first end being directly bonded to the front surface of the first substrate with no intervening matter between the first end and the front surface of the first substrate, said second end being directly bonded to the front surface of the second substrate with no intervening matter between the second end and front surface of the second substrate, wherein the first substrate comprises a first material that is substantially transparent to the laser radiation, and wherein the second substrate comprises a second material that is substantially transparent to the laser radiation, and wherein the second material differs from the first material.

25. A structure, comprising:
a first substrate having a front surface;
a second substrate having a front surface; and
at least one optical fiber having a first end and a second end, said optical fiber being substantially optically transparent to laser radiation of a given wavelength, said optical fiber being continuous and integral from the first end to the second end, said first end being directly bonded to the front surface of the first substrate with no intervening matters between the first end and the front surface of the first substrate, said second end being directly bonded to the front surface of the second substrate with no intervening matter between the second end and the front surface of the second substrate, wherein the first substrate comprises a material that is substantially transparent to the laser radiation, and wherein the second substrate comprises the material.

26. The structure of claim 17, wherein the substrate comprises a material selected from the group consisting of SiGe, GaAs, AlGaAs, and InGaAs.

27. The structure of claim 17, wherein the wavelength is in a range of 780 to 1550 nanometers.

28. A system, comprising:
means for melting an end of an optical fiber while the end is above, but not touching, an exposed surface of a substrate such that the end becomes molten, said substrate being substantially optically transparent to laser radiation of a given wavelength, said optical fiber being substantially transparent to laser radiation of a given wavelength;
means for moving the molten end toward the exposed surface of the substrate until the end makes physical contact with the exposed surface of the substrate, said moving being performed sufficiently fast so that the end is still molten when the end initially makes said physical contact with the exposed surface of the substrate; and
means for maintaining said physical contact for a sufficient length of time to enable the end to bond to the exposed surface of the substrate.

29. The system of claim 28, wherein said means for moving comprises means for constraining the molten end to move in a fixed direction toward the exposed surface.

30. The system of claim 28, wherein the substrate comprises an optical receiver, said system further comprising means for receiving said laser radiation by said optical receiver at said bonded end after said laser radiation has propagated through the optical fiber to said bonded end.

31. The system of claim 28, further comprising means for transmitting said laser radiation from within the substrate to the exposed surface of the substrate and then into the bonded end of the optical fiber.

32. The system of claim 31, wherein the means for transmitting comprises a Vertical Cavity Surface Emitting Laser (VCSEL), and wherein the substrate is substantially optically transparent to said laser radiation in an optical path in the substrate between the VCSEL and the bonded end of the optical fiber.

33. The system of claim 28, said substrate being a first substrate, said end being a first end of the optical fiber, said system further comprising:
means for orienting a second end of the optical fiber toward an exposed surface of a second substrate;
means for melting the second end of the optical fiber while the second end is above, but not touching, the exposed surface of the second substrate such that the second end becomes molten, said optical fiber being continuous and integral from the first end to the second end;
means for moving the molten second end toward the exposed surface of the second substrate until the second end makes physical contact with the exposed surface of the second substrate, said moving being executed sufficiently fast so that the second end is still molten when the second end initially makes said physical contact with the exposed surface of the second substrate; and means for maintaining said physical contact for a sufficient length of time to enable the second end to bond to the exposed surface of the second substrate with no intervening matter between the second end and the exposed surface of the second substrate.

34. The system of claim 33, wherein said means for orienting comprises means for rotating an end portion of the optical fiber, wherein the end portion includes the second end.

35. The system of claim 33, further comprising means for severing away a terminal portion of the optical fiber at a location along the optical fiber.

36. The system of claim 33, further comprising means for transmitting said laser radiation from within the first substrate to the exposed surface of the first substrate and then into the bonded first end of the optical fiber.

37. The system of claim 36, wherein the means for transmitting comprises a Vertical Cavity Surface Emitting Laser (VCSEL), and wherein the first substrate is substantially optically transparent to said laser radiation in an optical path in the first substrate between the VCSEL and the bonded first end of the optical fiber, and wherein the second substrate comprises an optical receiver.

38. The system of claim 28, wherein the substrate comprises a material selected from the group consisting of SiGe, GaAs, AlGaAs, and InGaAs.

39. The system of claim 28, wherein the wavelength is in a range of 780 to 1550 nanometers.

* * * * *

UNITED STATES PATENT AND TRADEMARK OFFICE
CERTIFICATE OF CORRECTION

PATENT NO.   : 6,917,728 B2
DATED        : July 12, 2005
INVENTOR(S)  : Lemmon et al.

It is certified that error appears in the above-identified patent and that said Letters Patent is hereby corrected as shown below:

Column 7,
Line 32, delete "molting" and insert -- melting --.
Line 33, delete "are" and insert -- arc --.

Column 8,
Line 48, delete "AIGAs" and insert -- AIGaAs --.

Column 9,
Line 18, delete "arc" and insert -- are --.

Signed and Sealed this

Twenty-seventh Day of September, 2005

JON W. DUDAS
*Director of the United States Patent and Trademark Office*